United States Patent [19]

Granday et al.

[11] Patent Number: 4,526,792
[45] Date of Patent: Jul. 2, 1985

[54] PROCESS OF PRODUCING A COAGULANT COMPOSITION FOR CHEESE PRODUCTION

[75] Inventors: Georges Granday; Marcel Jeandot, both of Beaune, France

[73] Assignee: S.A. Presure Granday, Beaune, France

[21] Appl. No.: 438,708

[22] Filed: Nov. 2, 1982

[51] Int. Cl.³ .......................................... A23C 19/032
[52] U.S. Cl. .................................... 426/56; 426/657; 426/63
[58] Field of Search ....................... 426/61, 63, 36, 37, 426/42, 56, 657; 435/219, 220, 221, 223, 226

[56] References Cited

U.S. PATENT DOCUMENTS

| | | | |
|---|---|---|---|
| Re. 30,669 | 7/1981 | Feldman | 426/36 |
| 3,151,039 | 9/1964 | Arima et al. | 426/36 |
| 3,692,630 | 9/1972 | Kichline et al. | 426/63 |
| 3,766,015 | 10/1973 | Dardas | 435/226 |
| 3,886,288 | 5/1975 | Rice et al. | 426/42 |
| 3,975,544 | 8/1976 | Kosikowski | 426/63 |
| 4,136,201 | 1/1979 | Feldman | 435/226 |
| 4,255,454 | 3/1981 | Branner-Jorgensen | 435/223 |

FOREIGN PATENT DOCUMENTS 1035897  7/1966  United Kingdom ............... 435/223

OTHER PUBLICATIONS

Cheese by Davis, Rennet (I): Preparation and Properties, 1965, pp. 248–249, 269.

Primary Examiner—Raymond Jones
Assistant Examiner—Marianne S. Minnick
Attorney, Agent, or Firm—Cushman, Darby & Cushman

[57] ABSTRACT

A coagulant composition for the cheese industry, whose purpose is to coagulate milk in the preparation of cheeses, is produced by mixing a first coagulant enzyme of fungic origin and non-coagulant proteic extracts from bovine reed. The composition may also contain a second proteolytic enzyme, extracted from another microbial strain or from bovine pepsin.

8 Claims, No Drawings

PROCESS OF PRODUCING A COAGULANT COMPOSITION FOR CHEESE PRODUCTION

The present invention relates to a coagulating composition intended to be used in the cheese industry, whose purpose is to coagulate milk in said industry and the cheese products obtained when using said composition.

RELATED ART

In general, the curds are obtained by means of rennet which is commonly extracted from calf reeds. The animal rennet mainly consists of two coagulating enzymes, the chymosine, which is not at all sensitive, as regards the coagulating power thereof, at a milk pH ranging from 6,6 and 6, and the bovine pepsine which, on the contrary, is very sensitive to this milk pH range and only represents about 20% of the coagulating power of the reed at a pH of 6,35. These two enzymes in the rennet have performances which are notably different as a function of the pH as regards the maturing of the cheeses.

SUMMARY OF THE INVENTION

The object of the present invention is to provide a coagulating composition intended to be used in the cheese industry, wherein a coagulant fungic enzyme is substituted for the rennet.

Another object of the present invention is to provide a coagulating composition having coagulating properties which are closer to those of the animal rennet and which are selectively modulable, as regards the curds and the maturing as well, in view of the kind of the relative cheeses which are desired to be obtained.

A further object of the present invention is to provide a coagulating composition which is intended to be used in the chees industry and which comprises at least a first coagulating enzyme from either fungic or microbial origin and a non-coagulating proteic compound extracted from the bovines reed meat.

Still another object of the present invention is to provide a coagulating composition which comprises a second synergistic enzyme which is, for instance, extracted from another fungic or microbial strain.

Other features and advantages of the present invention would be understood from the following description of non-limiting embodiments only given to illustrate the present invention.

As a result of the intensive experiments carried out by the Applicants, it has been found that the coagulant fungic enzymes, which are more particularly extracted from *Mucor miehei*, have interesting properties when used in a milk coagulating procedure and in cheese maturing methods, while having however a performance which is closer to that of the rennet chymosine enzyme alone than that of the rennet commonly used in cheese industry, said *Mucor miehei* enzymes imparting to almost all cheeses the well-known taste properties.

BRIEF DESCRIPTION OF THE PREFERRED EMBODIMENTS

In a first embodiment, the applicant has obtained hopeful results by suspending the *Mucor miehei* coagulating enzyme in a solution of proteic materials which are extracted from bovine reed, upon elimination of the coagulating power thereof. The thus obtained composition enables an activation of a certain lactic ferment which is advantageous to the cheese grade.

Similar compositions may be obtained when starting from coagulating enzymes which are extracted notably from *Mucor pusillus* or *Endothia parasitica*. By way of example, the composition according to the present invention has been obtained as follows:

A rennet solution has been first prepared by a conventional procedure as follows:

10 000 reeds of young calves which were fed only with milk, have been cut and steeped within a reservoir containing 10 000 liters of a solution having the following initial composition by weight:
water: 84%
sodium chloride: 15%
sodium benzoate: 1%

After 12 days of steeping, the support solution has been taken from the reeds.

Undesirable proteic and mucilagenous materials have been conventionally eliminated from the solution by means of a clearing process and of a physico-chemical filtration.

Following these two procedures, 10 400 liters of a light-yellow, clear and bright solution have been recovered and then subjected to ultrafiltration through diaphragms having a permeability of 12 000 Daltons.

The ultrafiltration has been stopped upon having recovered 6 000 liters of an ultrafiltrate which constitutes the non-coagulant proteic materials which have been extracted from bovine reeds.

While using a homogenous mixture, a mixture of enzymes is extracted from *Mucor miehei*, which are shaped as a brown powder having an activity of: 525 000 Soxhlet units/kg, and of the ultrafiltrate.

On purpose to obtain 1 liter of the mixture so called "Single Strength" according to the invention 39 g of enzyme powder were dissolved in 985 ml of the ultrafiltrate.

Then the mixture was filtered on purpose to eliminate the non-dissolved particles and the microbial germs.

The mixture obtained has an activity of 20 475 Soxhlet units. It will be understood that the activity may be varied according to the needs while modifying the amount of coagulating enzyme in one liter of mixture.

Besides, the Applicant has discovered that the coagulating composition of the present invention could be very efficient and have properties which are close to that of the rennet, but which can be modulated in view of the kinds of cheeses to be prepared, by adding to the first fungic coagulating enzyme a second proteolytic enzyme.

According to a second embodiment of the invention, the coagulating composition intended to be used in the cheese industry comprises a mixture of an enzyme which is extracted from a fungic or microbial strain, more particularly from *Mucor miehei*, and of a bovine pepsine compound which is extracted from the reeds of adult bovines. This mixture must be so carried out that the divergent properties of these two enzymes, as regards the milk coagulation as well as the cheese maturing, would impart to the resulting composition a performance which is closer to that of the rennet than that of each enzyme, when taken separately, and that the specific properties of both enzymes, as regards the performances in the cheese manufacturing, the textures and final test thereof, would restore in the mixture of rennet the regular effects to which the cheese consumers are accustomed, and that is notably the case for the manufacturing of soft mixtures and pasteurized pressed mixtures for fast food uses.

To this end, a fungic enzyme, typically extracted from *Mucor miehei*, is used in the mixture on purpose to provide thereto the whole coagulating power ranging from 30% to 85% of the whole coagulating power, the bovine pepsine being present in the mixture for having correlatively a whole coagulating power ranging from 70% of the regular coagulating power. The coagulating mixtures are manufactured on purpose to be as rich as possible in nitrogen-containing materials which are able to activate the lactic ferments.

This coagulating enzyme composition is also completed by adding thereto a non-coagulant proteic compound which is extracted from bovine reeds.

According to still another embodiment of the present invention, the coagulating composition intended to be used in the cheese industry comprises a mixture of the enzyme which is extracted from *Mucor miehei* strain and of a second fungic enzyme which is extracted from *Mucor pusillus*.

For the same grounds as those stated hereinabove, as regards the previous embodiment, the *Mucor miehei* enzyme is introduced in the composition as to adjust the whole coagulating power in the range from 30% to 85% of the regular coagulating power, the *Mucor pusillus* enzyme being introduced on purpose to obtain a coagulating power ranging from 15% to 70% of the whole coagulating power.

In these conditions, the *Mucor pusillus* enzyme has a performance, as regards the milk coagulation and the cheese maturing as well, which is substantially similar to that of bovine pepsine.

According to the invention, the composition is also improved by adding non-coagulating proteic compounds which have been extracted from reeds of young calves, these proteic materials being introduced on purpose to have an activating part in the lactic fermentation which enables the usual texture and test properties of the final cheeses to be restored.

Although the present invention has been described by way of particular embodiments, it is not limited by the latter but, on the contrary, is able to be modified or varied by those skilled in the art.

What we claim is:

1. A process of producing a coagulating composition adapted for a use in the cheese industry, said process comprising the steps of:
    (1) preparing a solution of a non-coagulating proteic material by steeping calves reeds pieces in a solution containing substantially about 84% water, about 15% sodium chloride, and about 1% sodium benzoate for a period of time sufficient to produce a solution containing non-coagulating proteic material;
    (2) filtering the solution resulting from step (1) and removing the milk-coagulating portion therefrom to form a solution of non-coagulating proteic material devoid of milk coagulating enzymes; and
    (3) suspending a slurry of at least one coagulating enzyme extracted from a microbial or fungal strain in the solution of non-coagulating proteic material resulting from step (2), thereby producing said coagulating composition.

2. The coagulating composition produced by the process of claim 1.

3. The process of claim 1 in which the solution in step (2) is filtered through an ultrafiltration diaphram having a permeability of 12,000 Daltons.

4. The process of claim 1 in which the coagulating enzyme of step (3) is extracted from *Mucor miehei*.

5. The process of claim 1 in which the coagulating enzyme of step (3) is extracted from *Mucor pusillus*.

6. The process of claim 1 in which the coagulating enzyme of step (3) is a mixture of enzymes extracted from *Mucor miehei* and *Mucor pusillus*.

7. The process of claim 6 in which the enzyme extracted from *Mucor miehei* has a coagulating power of from 30% to 85% of the total coagulating enzyme employed and the enzyme extracted from *Mucor pusillus* has a coagulating power of from 15% to 70% of the total coagulating enzyme employed.

8. The process of claim 4 in which bovine pepsin is also included as a coagulating enzyme.

* * * * *